Dec. 14, 1926.
W. L. PAUL
DISK HARROW
Filed Sept. 2, 1921    3 Sheets-Sheet 1
1,610,311
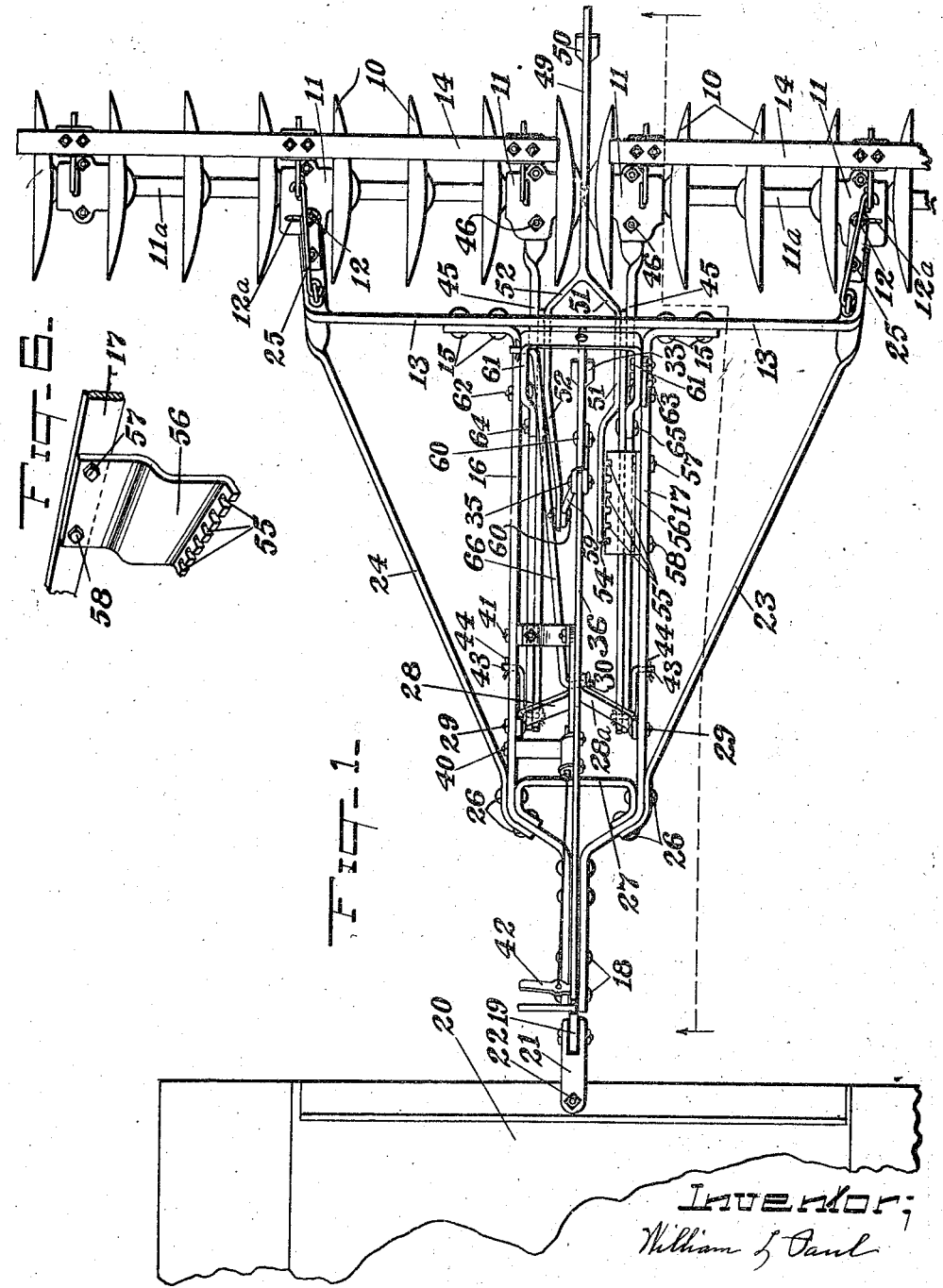

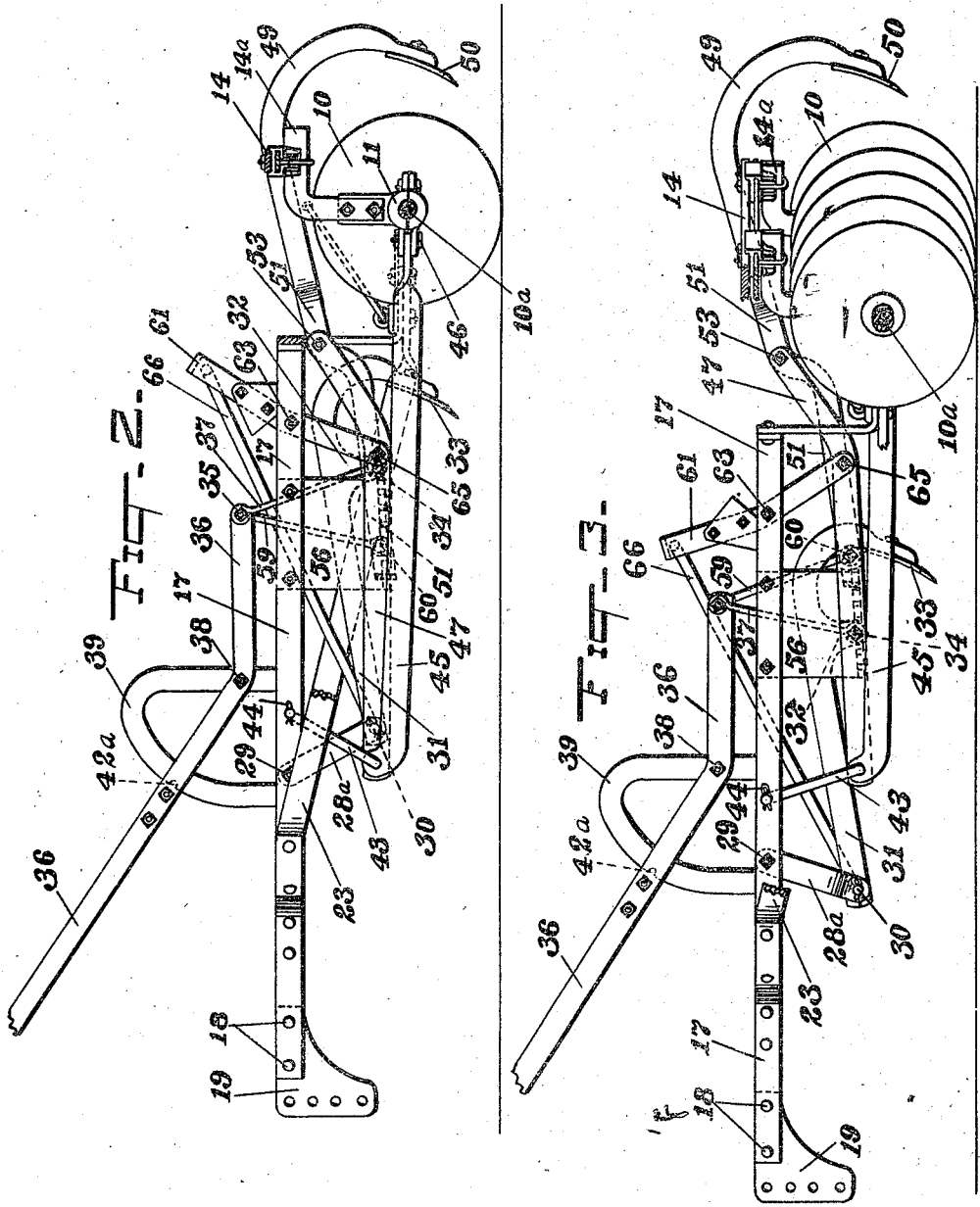

Dec. 14, 1926.
W. L. PAUL
DISK HARROW
Filed Sept. 2, 1921
1,610,311
3 Sheets-Sheet 3
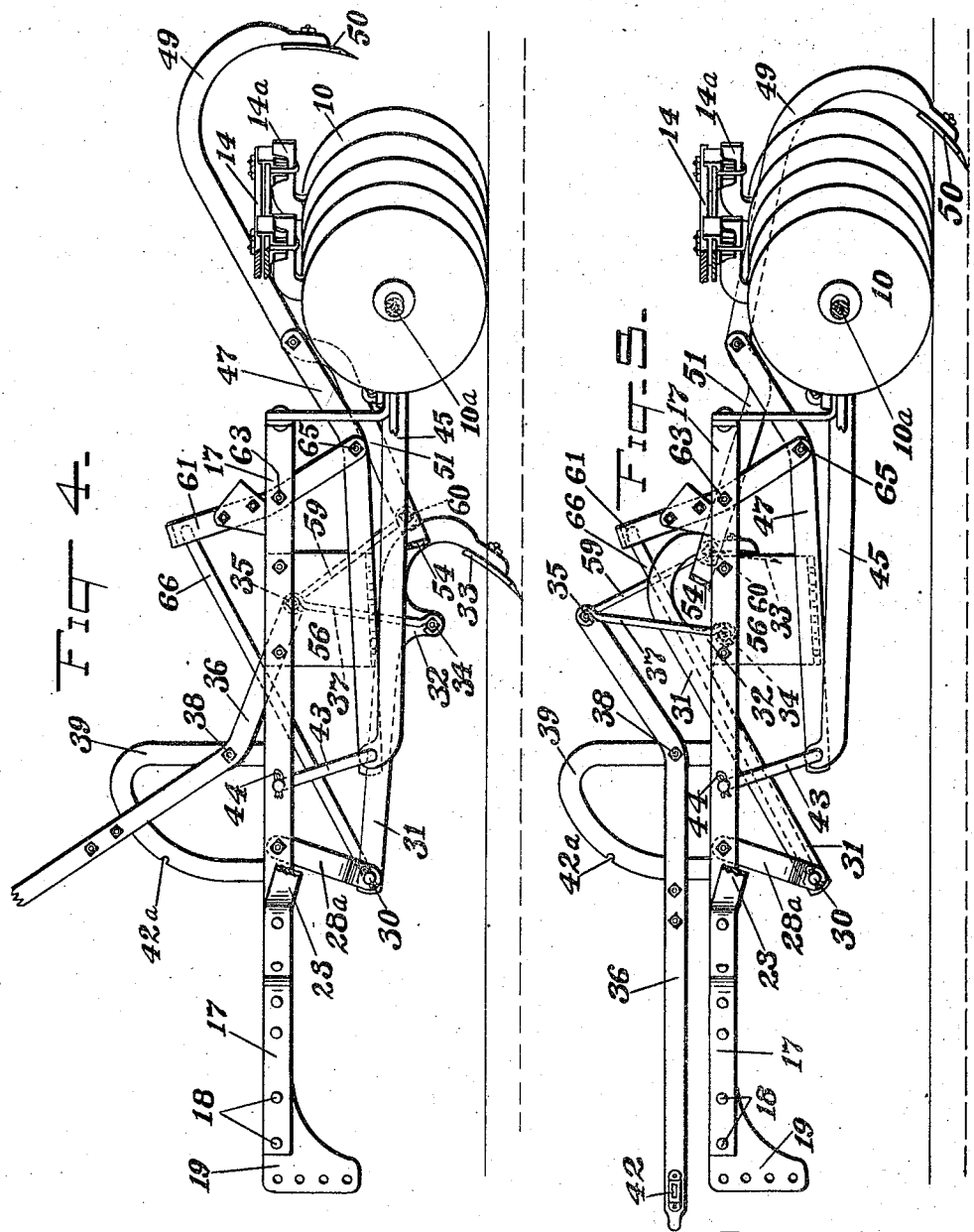
Witness;
E. Wilderson
Inventor;
William L. Paul
by H. H. Bliss
Attorney.

Patented Dec. 14, 1926.

1,610,311

UNITED STATES PATENT OFFICE.

WILLIAM L. PAUL, OF BERKELEY, CALIFORNIA, ASSIGNOR TO DEERE & COMPANY, OF MOLINE, ILLINOIS, A CORPORATION OF ILLINOIS.

DISK HARROW.

Application filed September 2, 1921. Serial No. 497,853.

This invention relates to disk harrows and has to do with means for angling the disk gangs.

It is well known that in disk harrows it is necessary to place the gangs of disks at an angle to the forward line of draft of the harrow in order to secure the proper cutting action of the disks on the soil. When the disks are in alignment with the line of advance there is practically no action on the soil, but by angling the disks a cutting action is obtained which is increased as the angle of the disks to the line of advance is increased. In operation it is desirable to vary this angle to suit the varying soil conditions.

The objects of the invention are; to provide means optionally movable into engagement with the ground to utilize the forward movement of the harrow relative to the ground engaging means to automatically adjust the position of the gangs; to provide for a manual control of the automatic means in such a harrow, to regulate the adjustment of the gangs to any desired angle within their working limits; and to provide means that will hold the gangs in their adjusted position.

Referring to the accompanying drawings in which like numerals indicate identical parts—

Figure 1 is a top plan view of a single action disk harrow, the gangs in non-working or transport position, and the angling means in neutral position.

Figure 2 is a side elevation of Figure 1.

Figure 3 is a side elevation of Figure 1, but with the disk gangs shown in angled or working position.

Figure 4 is a side elevation of Figure 1 with the gangs in angled position and the angling means shown in position to straighten the gangs.

Figure 5 is a side elevation of Figure 1 with the gangs in angled position with the angling means in the position assumed when angling the gangs and before being returned to the neutral position.

Figure 6 is a detail view of the plate for holding the gangs in adjusted position.

The disk gangs are of the usual and well known type having a series of disks indicated at 10 mounted on a shaft $10^a$ supported by bearings contained and rotatable in bearing boxes 11. The disks 10 are spaced apart on the shaft by means of the usual spacers $11^a$. The disk gangs are pivotally connected with the arms of a transverse frame bar 13 by means of bolts 12 which extend through slots $12^a$ in the center bearing boxes 11. The gangs are adjustable angularly relative to the line of advance, around the bolt 12 as a pivot, by means hereinafter described. The usual scraper bars 14 are supported from the bearing boxes 11 by means of L-shaped arms $14^a$. Connected to the transverse frame bar 13, by rivets 15 are forwardly extending parallel frame bars 16 and 17, which are bent toward each other and secured together at their forward ends and to which is attached by rivets or bolts 18 a clevis plate 19, which may be connected to a tractor 20 by any preferred means, such as a clevis 21 and a bolt 22. It is understood the tractor 20 may be of any preferred type or make and the draft connections changed to suit the tractor. Forwardly converging side frame bars 23 and 24 are attached at their rear ends to the arms of the bar 13 by means of bolts 25 and at their forward ends to the bars 16 and 17 respectively by means of rivets 26. The rivets 26 also hold securely to the bars 16 and 17 a brace 27. Two depending straps 28 and $28^a$ are pivoted at their upper ends by means of bolts 29 to the parallel portion of the bars 16 and 17 respectively and are bent at their lower ends so they approach each other at a point approximately in the center line of the harrow. On a pin 30, in the lower ends of the straps 28 and $28^a$, and between the straps is pivoted a rearwardly extending beam 31, having intermediate its length a depending portion 32. The rear portion of the beam 31 is bent downwardly and carries an earth engaging tool 33. Pivoted at its lower end at 34 to the depending portion 32 of the beam 31, and at its upper end at 35 to the end of a lever 36, is a link 37. The lever 36 is pivoted intermediate its length at 38 to a sector 39 securely fastened by bolts 40, 41 to the frame bar 16. The lever 36 extends forwardly and is within convenient reach of the operator upon the tractor and carries a latch 42 of the usual type which operates the usual spring pressed dog adapted to engage a notch $42^a$ in the sector 39. Drag bars 45 are pivotally connected at their forward ends to the frame bars 16 and 17 by links 43 which have inturned lower ends and outturned upper ends extending through the drag bars and frame bars respectively, and are held in place by suitable means, such as cotters 44. The drag bars 45 are pivotally attached at their rear ends to the inner bearing boxes 11 by means of bolts 46. Also pivotally attached to the links 43 are rearwardly extending bars 47 which are upturned at their rear ends. A beam 49 extends over and between the disk gangs and on a downwardly extending rear portion carries an earth engaging tool 50. The beam 49 at a point in front of the disk gangs has diverging portions 51 and 52, which are pivoted intermediate their ends at 53 to the upturned portions of the bars 47 and extend forwardly therefrom. The forward portion of the diverging member 51 carries a lug or dog 54 adapted to engage one of a series of notches 55 in a plate 56 secured to the frame bar 17 by bolts 57 and 58. A link 59 is pivoted at its upper end at 35 to the lever 36 and at its lower end at 60 to the forward end of the diverging member 52. The side portions of a yoke 61 are pivoted at 62 and 63 to the frame bars 16 and 17 respectively and at their lower ends to the bars 47 by means of bolts 64 and 65. A link 66 pivotally connects the upper end of the yoke 61 to the lower ends of the depending straps 28 and 28ᵃ.

The operation of the angling device is as follows: Presuming the gangs to be in transport position with the angling device in neutral position at which time the dog of the hand latch 47 is in the notch 42ᵃ in the sector 39, as shown in Figure 2, and the lug 54 on the member 51 at the same time engaging the forward notch in the plate 56, as shown in Figure 1, by disengaging the latch 47 from the notch 42ᵃ and stroking the lever 36 downwardly the beam 31 will be raised by the link 37 and the rear end of the beam 49 will be lowered so the tool 50 will engage the ground. At the time the rear portion of the beam 49 is lowered the diverging portions 51 and 52 will be raised and the lug 54 will be moved out of engagement with the forward notch 55 in the plate 56. With the tool 50 engaging the ground and acting as an anchor and the harrow as a unit being moved forwardly relative to the tool 50 by the draft means, such as a tractor 20, the disk gangs will be angled by reason of the beam 49 being connected to the links 43 through the bars 47 and the draft bars 45 also being connected to the links 43 and the disk gangs which are pivoted at 12, as before described. At the completion of this movement the various parts will assume the position shown in Figure 5. When the disk gangs have angled to the desired position the lever 36 is raised until the dog on the latch 42 again engages the notch in the sector 39, which movement will lower the beam 31 and the portions 51 and 52 of the beam 49, through the links 37 and 59, and allow the lug 54 to engage one of the notches 55, and at the same time the rear portion of the beam 49 will be raised and the tool 50 lifted from engagement with the ground. The various parts will then be securely held in the positions shown in Figure 3. To reverse the action described and straighten the gangs the lever 36 is stroked upwardly which will lower the beam 31 allowing the tool 33 to engage the ground and at the same time the portions 51 and 52 of the beam 49 will be lowered disengaging the lug 54 from the notch 55 and the rear portion of the beam 49 will be raised. The beam 31 by its engagement with the ground through the tool 33 will cause the straps 28ᵃ and 28 to swing rearwardly which in turn, through the link 66, the yoke 61 and the bars 47, will swing the links 43 forwardly which, by reason of their connection with the disk gangs through the draft bars 45, will cause the disk gangs to be straightened, and when in the desired position the lever 36 is again returned to the neutral position and the beam 31 will be raised as will also the forward portion of the beam 49 and the lug 54 will again engage one of the notches 55 and the parts will be again locked in position.

While I have chosen to show my disk angling means attached to a single action harrow it is to be understood it is equally adapted for use with a double action harrow in which, as is well known, a trailing set of disk gangs is used, and by connecting the rearward gangs to the angling means the rearward set of gangs will be adjusted simultaneously with and in the same manner as the forward set.

What I claim is—

1. In a disk harrow, the combination of a frame, a plurality of disk gangs connected with the frame and adapted to be adjusted angularly relative to the line of advance, means connected with the frame and with the gangs and movable into engagement with the ground for adjusting the angular position of the gangs.

2. In a disk harrow, the combination of a frame, a plurality of disk gangs connected with the frame and adapted to be adjusted angularly relative to the line of advance, means connected with the frame and with the gangs and movable into engagement with the ground for straightening the gangs when they are in angled position.

3. In a disk harrow, the combination of a frame, a plurality of disk gangs connected with the frame and adapted to be adjusted angularly relative to the line of advance, means connected with the frame and with the gangs and movable into engagement with the ground for moving the gangs away from their straight position.

4. In a disk harrow, the combination of a frame, disk gangs connected with the frame and adapted to be adjusted angularly relative to the line of advance, mechanism carried by the frame for adjusting the gangs angularly and for straightening the gangs when they are in angled position, said mechanism including oppositely movable ground engaging means, actuating connections between the ground engaging means and the gangs, and means for optionally moving the ground engaging means into engagement with the ground.

5. In a disk harrow, the combination of a frame, a plurality of disk gangs connected with the frame, and adapted to be adjusted angularly relative to the line of advance, means connected with the frame and with the disks and movable into engagement with the ground for adjusting the disks angularly, and locking means for holding the gangs in adjusted position.

6. In a disk harrow, the combination of a frame, a plurality of disk gangs connected with the frame and adapted to be adjusted angularly relative to the line of advance, means connected with the frame and with the gangs and movable into engagement with the ground for straightening the gangs when they are in angled position, and locking means actuated by movement of said ground engaging means for holding the gangs in adjusted position.

7. In a disk harrow, the combination of a frame, disk gangs connected with the frame and adapted to be adjusted angularly relative to the line of advance, mechanism carried by the frame for adjusting the gangs angularly and for straightening the gangs when they are in angled position, said mechanism including oppositely movable ground engaging means, actuating connections between the ground engaging means and the gangs, and means for optionally moving the ground engaging means into engagement with the ground and locking means controlled by movement of said ground engaging means for holding the gangs in adjusted position.

8. In a disk harrow, the combination of a frame, disk gangs connected with the frame and adapted to be adjusted angularly relative to the line of advance, ground engaging means connected with the frame to move fore and aft relatively thereto, and movable into engagement with the ground, and actuating connections between the ground engaging means and the gangs operable by the engagement of said ground engaging means with the ground to adjust the gangs angularly.

9. In a disk harrow, the combination of a frame, disk gangs connected with the frame and adapted to be adjusted angularly relative to the line of advance, a plurality of ground engaging means carried by the frame and optionally movable into engagement with the ground and actuating connections between the ground engaging means and the gangs.

10. In a disk harrow, the combination of a frame, disk gangs connected with the frame, and adapted to be adjusted angularly relative to the line of advance, ground engaging devices connected to move simultaneously in opposite directions optionally movable into engagement with the ground, said devices being connected with the frame and with the gangs for adjusting the position of the gangs angularly, and locking means for holding the gangs in adjusted position when said devices are out of operative position.

11. In a disk harrow, the combination of a frame, disk gangs connected with the frame and adapted to be adjusted angularly relative to the line of advance, ground engaging means optionally movable into engagement with the ground, said means being mounted to swing in the frame when in engagement with the ground, and connections between the ground engaging means and the gangs actuated by the swinging of the ground engaging means.

12. In a disk harrow, the combination of a frame, disk gangs connected with the frame and adapted to be adjusted angularly relative to the line of advance, ground engaging means optionally movable into engagement with the ground, said means being mounted to swing in the frame when in engagement with the ground, and connections between the ground engaging means and the gangs actuated by the swinging of the ground engaging means, and locking means for holding the gangs in adjusted position.

13. In a disk harrow, the combination of a frame, disk gangs connected with the frame and adapted to be adjusted angularly relative to the line of advance, oppositely movable ground engaging means mounted to swing in the frame when in engagement with the ground, means for optionally moving said ground engaging means into engagement with the ground, and actuating connections between the ground engaging means and the gangs.

14. In a disk harrow, the combination of a frame, disk gangs connected with the frame and adapted to be adjusted angularly relative to the line of advance, oppositely movable ground engaging means mounted to swing in the frame when in engagement with the ground, means for optionally moving either of said ground engaging means into engagement with the ground, and locking means operable by movement of both of said ground engaging means out of operative position for holding the gangs in adjusted position.

15. In a disk harrow, the combination of a frame, disk gangs connected with the frame, and adapted to be adjusted angularly relative to the line of advance, two ground engaging means connected with the frame and optionally movable into engagement with the ground, either of said ground engaging means, when in engagement with the ground, reversing the action of the other, and actuating connections between the ground engaging means and the gangs.

16. In a disk harrow, the combination of a frame, disk gangs connected with the frame, and adapted to be adjusted angularly relative to the line of advance, two ground engaging means connected with the frame and optionally movable into engagement with the ground, either of said ground engaging means, when in engagement with the ground, reversing the action of the other, and actuating connections between the ground engaging means and the gangs, and locking means controlled by movement of said ground engaging means for holding the gangs in adjusted position.

17. In a disk harrow, the combination of a frame, disk gangs connected with the frame and adapted to be adjusted angularly relative to the line of advance, means connected with the frame and with the gangs, and adapted to be moved into engagement with the ground, and means, under control of the operator, for moving said means into or out of engagement with the ground.

18. In a disk harrow, the combination of a frame, disk gangs connected with the frame and adapted to be adjusted angularly relative to the line of advance, ground engaging means movable simultaneously in opposite directions and mounted to swing in the frame when in engagement with the ground, means for optionally moving one or the other of said ground engaging means into engagement with the ground, and actuating connections between the ground engaging means and the gangs.

19. In a disk harrow, the combination of a frame, disk gangs connected with the frame and adapted to be adjusted angularly relative to the line of advance, gang adjusting mechanism carried on the frame comprising vertically movable ground engaging means connected together to move simultaneously in opposite directions, means for optionally alternatively moving the ground engaging means into engagement with the ground, and connections between the ground engaging means and the gangs actuated by one or the other of the ground engaging means while in engagement with the ground to move said gangs in one direction or the other.

20. A gang shifting mechanism for disk harrows comprising an anchoring member movable into or out of engagement with the ground and means operated by said anchoring member to shift the gang by power derived from the travel of the harrow.

21. In a disk harrow, a main frame, shiftable disks and an anchoring member movable into or out of engagement with the ground and operative by the movement of the harrow to change the angle of the disks relative to the line of draft.

22. In a disk harrow, a main frame, shiftable disks and anchoring members movable alternatively into or out of engagement with the ground and operative by the forward movement of the harrow to respectively shift the disks from transport to working position or from working position to transport position.

23. In a disk harrow, a main frame, shiftable disks and an anchoring member movable into or out of engagement with the ground and operative by the movement of the harrow to change the angle of the disks relative to the line of draft, and means controlled by movement of said anchoring member for holding the disks in adjusted position.

24. In a disk harrow, a main frame, shiftable disks and anchoring members movable alternatively into or out of engagement with the ground, and operative by the forward movement of the harrow to respectively shift the disks from transport to working position or from working position to transport position, and means controlled by movement of said anchoring members out of operative position for holding the disks in adjusted position.

WILLIAM L. PAUL.